(12) United States Patent
Tu et al.

(10) Patent No.: US 11,816,469 B2
(45) Date of Patent: Nov. 14, 2023

(54) RESOLVING THE VERSION MISMATCH PROBLEM WHEN IMPLEMENTING A ROLLING UPDATE IN AN OPEN-SOURCE PLATFORM FOR CONTAINER ORCHESTRATION

(71) Applicant: INTERNATIONAL BUSINESS MACHINES CORPORATION, Armonk, NY (US)

(72) Inventors: Hong Jun Tu, Beijing (CN); Wen Tao Zhang, Beijing (CN); Yang Yang, Beijing (CN); Yiwen Huang, Markham (CA); Ye Cui, Beijing (CN); Xiao Kai Dong, Beijing (CN); Yu Chi Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 17/448,357

(22) Filed: Sep. 22, 2021

(65) Prior Publication Data
US 2023/0088858 A1    Mar. 23, 2023

(51) Int. Cl.
G06F 9/445    (2018.01)
G06F 8/65     (2018.01)
H04L 45/02    (2022.01)

(52) U.S. Cl.
CPC .............. *G06F 8/65* (2013.01); *H04L 45/02* (2013.01)

(58) Field of Classification Search
CPC .................................... G06F 8/65; H04L 45/02
USPC ........................................................ 717/168
See application file for complete search history.

(56) References Cited

U.S. PATENT DOCUMENTS

| 8,341,193 B2 | 12/2012 | Jones |
|---|---|---|
| 2019/0095253 A1 | 3/2019 | Curtis |
| 2021/0055947 A1 | 2/2021 | Mahajan |

(Continued)

FOREIGN PATENT DOCUMENTS

| CN | 110333889 | * 10/2019 | ............... G06F 8/65 |
|---|---|---|---|
| CN | 110912734 A | 3/2020 | |

(Continued)

OTHER PUBLICATIONS

Giraldo, "Rolling Update and Monitoring Deployment Strategy for Edge Layer IoT Devices," Universidad De Los Andes Systems and Computing Engineering Department, Jun. 2020, 28 pages.

(Continued)

*Primary Examiner* — Chuck O Kendall
(74) *Attorney, Agent, or Firm* — Anthony M. Pallone (57) ABSTRACT

According to one embodiment, a method, computer system, and computer program product for container lifecycle management is provided. The embodiment may include registering a topology for a plurality of deployments in a container orchestration platform. The embodiment may include detecting a rolling update to a deployment of the plurality of deployments. The embodiment may include assuming ownership of at least one previous version pod of the deployment. The embodiment may include creating network routing rules for the at least one previous version pod. The embodiment may include routing network packets to the at least one previous version pod based on the created network routing rules.

20 Claims, 5 Drawing Sheets

(56) References Cited

U.S. PATENT DOCUMENTS

2021/0072966 A1    3/2021  Zong
2022/0035626 A1*  2/2022  Kapoor .................. G06F 8/656

FOREIGN PATENT DOCUMENTS

| CN | 111258609 A | 6/2020 |
| KR | 20200027780 A | 3/2020 |

OTHER PUBLICATIONS

Mell et al., "The NIST Definition of Cloud Computing", National Institute of Standards and Technology, Special Publication 800-145, Sep. 2011, 7 pages.

Newton-King, "Versioning gRPC services," Microsoft Build, Jan. 9, 2020, Retrieved from the Internet: https://docs.microsoft.com/en-us/aspnet/core/grpc/versioning?view=aspnetcore-3.1, 6 pages.

* cited by examiner

RESOLVING THE VERSION MISMATCH PROBLEM WHEN IMPLEMENTING A ROLLING UPDATE IN AN OPEN-SOURCE PLATFORM FOR CONTAINER ORCHESTRATION

BACKGROUND

The present invention relates generally to the field of computing, and more particularly to open-source container lifecycle management.

Cloud computing increasingly implements container systems for deployment of cloud services. Open-source container environments offer adaptive load balancing, service registration, deployment, operation, resource scheduling, and capacity scaling. Container orchestration is the automation of much of the operational effort required to run containerized workloads and services. For example, a container orchestration system, such as the Kubernetes® container orchestration platform (Kubernetes is a registered trademark of The Linux Foundation and/or its affiliates), may automate the provisioning, deployment, networking, scaling, availability, and lifecycle management of containers. Containerized applications are typically deployed in a unit referred to as a pod, and a pod may have one or more containers running within it. As part of pod lifecycle management, a container orchestration system provides one or more mechanisms for activating (also referred to as deploying or starting), running, and deactivating (also referred to as stopping) pods.

SUMMARY

According to one embodiment, a method, computer system, and computer program product for container lifecycle management is provided. The embodiment may include registering a topology for a plurality of deployments in a container orchestration platform. The embodiment may include detecting a rolling update to a deployment of the plurality of deployments. The embodiment may include assuming ownership of at least one previous version pod of the deployment. The embodiment may include creating network routing rules for the at least one previous version pod. The embodiment may include routing network packets to the at least one previous version pod based on the created network routing rules.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to open-source container lifecycle management. The following described exemplary embodiments provide a system, method, and program product to, among other things, maintain both a previous and updated version of a service within a container orchestration system and dynamically route service requests to the correct version of the service. Therefore, the present embodiment has the capacity to improve the technical field of open-source container lifecycle management by providing a system to maintain a high availability of a service within a container orchestration system, notwithstanding the occurrence of a rolling update to the service.

As previously described, cloud computing increasingly implements container systems for deployment of cloud services. Open-source container environments offer adaptive load balancing, service registration, deployment, operation, resource scheduling, and capacity scaling. Container orchestration is the automation of much of the operational effort required to run containerized workloads and services. For example, a container orchestration system, such as the Kubernetes® container orchestration platform, may automate the provisioning, deployment, networking, scaling, availability, and lifecycle management of containers. Containerized applications (e.g., cloud microservices) are typically deployed in a unit referred to as a pod, and a pod may have one or more containers running within it. As part of pod lifecycle management, a container orchestration system provides one or more mechanisms for activating (also referred to as deploying or starting), running, and deactivating (also referred to as stopping) pods.

In the context of an open-source platform for container orchestration, such as a Kubernetes® environment, a deployment is a management component used to declare desired behavior or characteristics (e.g., policies and configurations) of one or more pods which are later implemented via a Kubernetes® controller component. A deployment may tell Kubernetes® how to create or modify instances of the pods that hold a containerized application. For example, a deployment may be used to update an existing pod to a new containerized application version by updating the container image. There may be multiple deployments within a Kubernetes® cluster. Additionally, in such an environment, there may typically be internal (i.e., backend) services (e.g., a load balancer service) between pods within a deployment as well as between pods of different deployments. As such, service dependencies between pods, where some pods act as client pods and other pods act as server pods, may exist. These services may use open-source remote procedure calls (RPC), representational state transfer (REST) protocols, or other user-defined application protocols, such as transmission control protocol (TCP) or user datagram protocol (UDP), to facilitate network communications between client and server pods. It is common practice for an RPC-based or REST-based service to change its communication data structure, also known as its payload, to for example, change methods or parameters, and thus require a regeneration of relevant client and server code (i.e., require a service version update). In such cases, in order to maintain a high level of availability of services within the environment (e.g., a Kubernetes® cluster), both client and server pods are expected to update without connection drops or network protocol communication mismatch issues as may arise when a client pod sends a previous version payload to an updated server pod. Such issues may present a significant problem for service availability in situations where client pods and server pods are implemented or owned by different groups or organizations, as it may be difficult to negotiate a maintenance window to update or rollback the client and server pods together. It may therefore be imperative to have a system in place to provide container image version management and correct routing of service requests during an update within an open-source platform for container orchestration (e.g., a rolling update in a Kubernetes® environment). Thus, embodiments of the present invention may provide advantages including, but not limited to, leveraging the rolling update capability provided by a container orchestration system, maintaining a previous and an updated version of a service, dynamically routing service requests to a correct version of service pods, and ensuring a high level of service availability during a service update. The present invention does not require that all advantages need to be incorporated into every embodiment of the invention.

According to at least one embodiment, when an updated service version is declared via a deployment, registered information of the service's topological relationships and dependencies with other services may be collected, information of pods of the service, such as container image version and internet protocol (IP) tables, may also be collected, control of lifecycle management of old pods may be assumed, and IP forwarding rules may be generated and managed to avoid communication between mismatched pod versions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to maintain both a previous and updated version of a service within a container orchestration system and dynamically route service requests to the correct version of the service.

Figure 1:
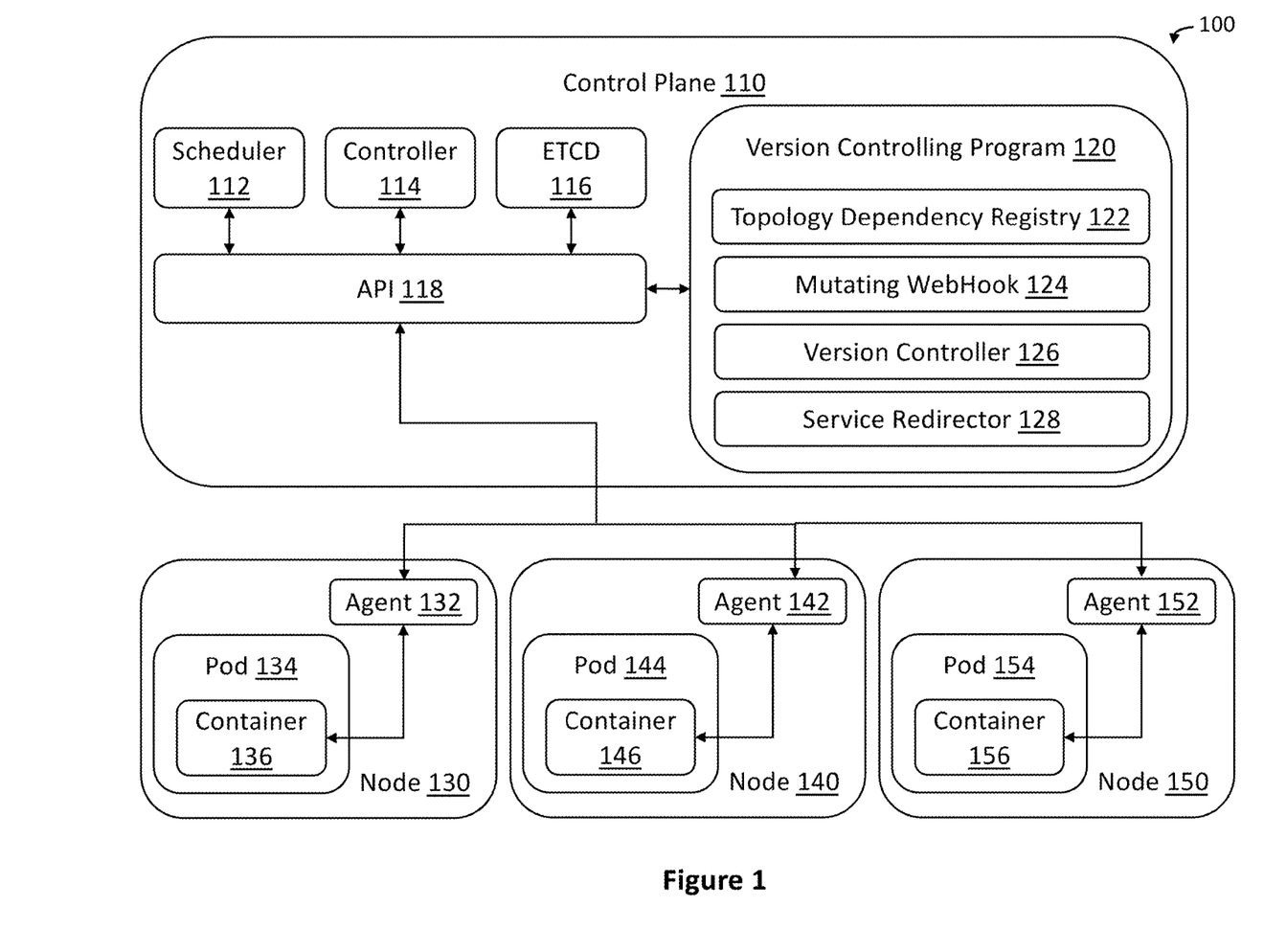
FIG. 1 illustrates an exemplary container orchestration system according to at least one embodiment.

Referring to FIG. 1, an exemplary container orchestration system 100 is depicted, according to at least one embodiment. The container orchestration system 100 may include a control plane 110 and nodes 130, 140, and 150 in communication therewith. Collectively, the control plane 110 and the nodes 130, 140, and 150, may represent and be referred to as a cluster (e.g., a Kubernetes® cluster). FIG. 1 is illustrated as a container orchestration system 100 having one control plane 110 and three nodes 130, 140, and 150 each with one pod 134, 144, and 154, respectively; one skilled in the art of open-source container orchestration systems will recognize that such a system may have multiple control planes, include various numbers of nodes, that each node may have multiple pods, and that the number of pods may vary between nodes.

The control plane 110 has a scheduler 112, a controller 114, an ETCD 116, an API 118, and a version controlling program 120, each its own process. The scheduler 112 may watch for newly created pods without an assigned node and select a node for them to run on. The controller 114 may execute controller processes and reconcile an actual state of the container orchestration system 100 with a desired state. The ETCD 116 may be a persistent key-value data store that stores configuration data of the container orchestration system 100. The API 118 may expose an RPC-based or REST-based interface and communicate with each of the other components of the control plane 110 including the scheduler 112, the controller 114, the ETCD 116, and the version controlling program 120. The API 118 may also communicate with components external to the control plane 110. The control plane 110 may also communicate with and act upon the nodes 130, 140, and 150 on the cluster via the API 118. The control plane 110 may be a laptop computer, netbook computer, personal computer (PC), a desktop computer, or any programmable electronic device or any network of programmable electronic devices capable of hosting and running the scheduler 112, the controller 114, the ETCD 116, the API 118, and the version controlling program 120. As will be discussed with reference to FIG. 3, the control plane 110 may include internal components 402a and external components 404a, respectively. Although depicted as hosted within a single computing device, in at least one other embodiment, components of the control plane 110 may be hosted within any computing device of the container orchestration system 100. The control plane 110 may also operate in a cloud computing service model, such as Software as a Service (SaaS), Platform as a Service (PaaS), or Infrastructure as a Service (IaaS). Control plane 110 may also be located in a cloud computing deployment model, such as a private cloud, community cloud, public cloud, or hybrid cloud.

Nodes 130, 140, and 150 may be a laptop computer, netbook computer, personal computer (PC), a desktop computer, or any programmable electronic device or any network of programmable electronic devices capable of hosting and running agents 132, 142, 152, respectively, and pods 134, 144, 154, respectively. The pods 134, 144, and 154 may each include a container 136, 146, and 156, respectively. The agents 132, 142, and 152 may each be a program that monitors the state of pods 134, 144, and 154, respectively. The agents 132, 142, and 152 may communicate metrics (e.g., IP tables, container image data) of their respective pods and containers to components of the control plane 110 via the API 118. Furthermore, the agents 132, 142, and 152 may act upon their respective pods and containers as directed by components of the control plane 110 via the API 118. For example, the agents 132, 142, and 152 may update IP tables for their respective pods as directed by the version controlling program 120, the service redirector 128 and the API 118. Although depicted as physical machines, in at least one other embodiment, the nodes 130, 140, and 150 may be virtual machines. As will be discussed with reference to FIG. 3, the nodes 130, 140, and 150 may include internal components 402b,c,d and external components 404b,c,d, respectively. The nodes 130, 140, and 150 may operate in a cloud computing service model, such as Software as a Service (SaaS), Platform as a Service (PaaS), or Infrastructure as a Service (IaaS). Nodes 130, 140, and 150 may also be located in a cloud computing deployment model, such as a private cloud, community cloud, public cloud, or hybrid cloud.

According to at least one embodiment, the nodes 130, 140, and 150 may each be part of a separate deployment within the cluster and their respective pods (i.e., pods 134, 144, and 154) may each run a separate containerized application (e.g., microservice) within their respective containers (i.e., containers 136, 146, and 156). As such, according to at least one embodiment, application dependencies may exist between the pods 134, 144, and 154 of the nodes 130, 140, and 150. For example, node 130 may be part of a deployment A, node 140 may be part of a deployment B, and node 150 may be part of a deployment C. Each of the deployments A, B, and C may represent a separate microservice which may be accessed by, and create dependencies among, the nodes 130, 140, and 150.

According to the present embodiment, the version controlling program 120 may include subcomponents topology dependency registry 122, mutating webhook 124, version controller 126, and service redirector 128. The version controlling program 120 may be a program, or subroutine contained in a program, that may detect when a container image version update to one or more pods of the cluster is declared via a deployment (e.g., a rolling update in a Kubernetes® cluster). In response to detecting the container image version update, the version controlling program 120 may take over the lifecycle management of previous version pods, create a shadow service to handle the network traffic of the previous version pods, and dynamically route service requests within the cluster to a correct version of pods. The pod lifecycle management during a rolling update method is explained in further detail below with respect to FIG. 2.

Figure 2:
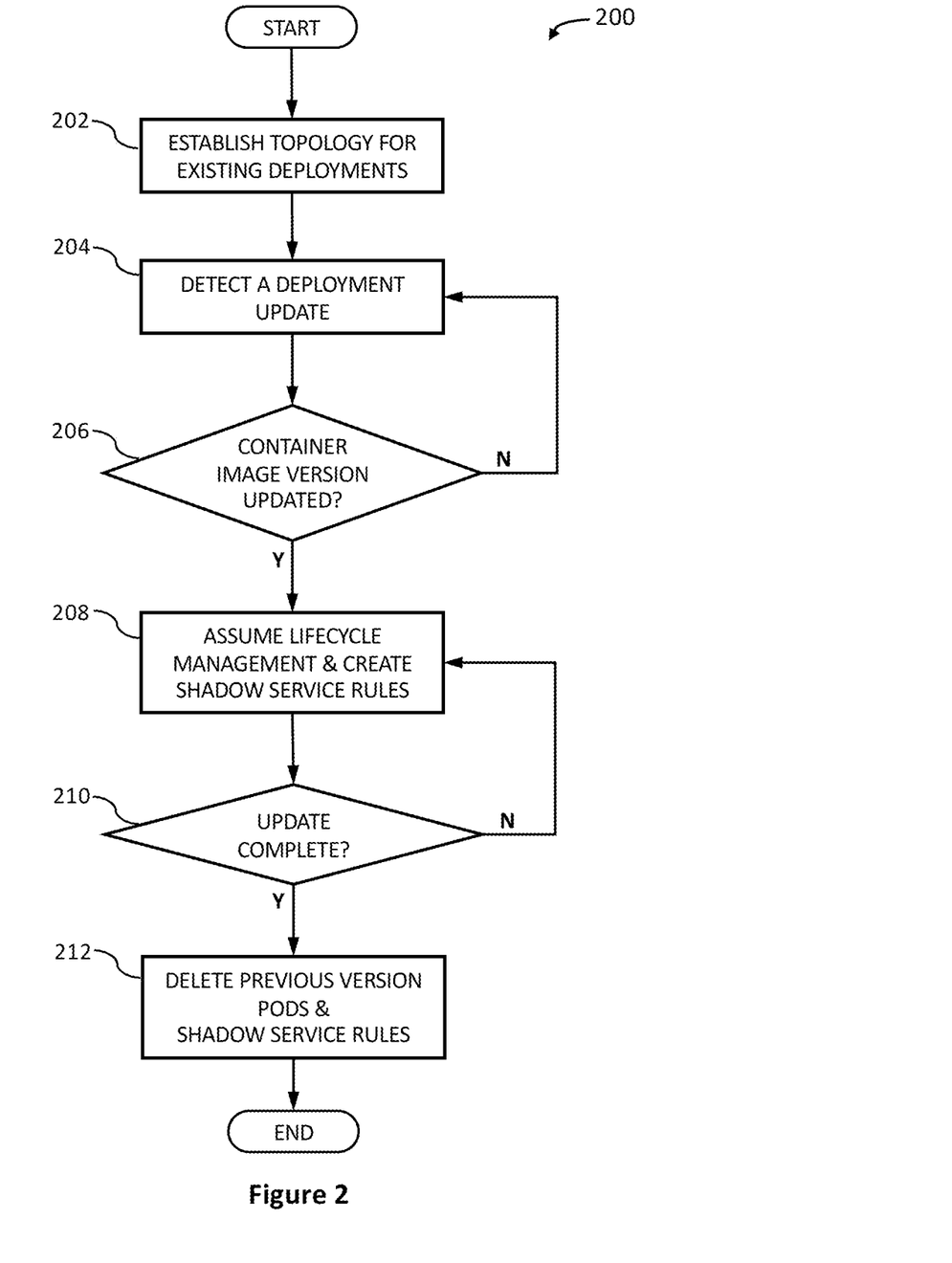
FIG. 2 illustrates an operational flowchart for managing pod lifecycles during a rolling update process according to at least one embodiment.

Referring now to FIG. 2, an operational flowchart illustrating pod lifecycle management during a rolling update process 200 is depicted according to at least one embodiment. At 202, the version controlling program 120 allows (e.g., via a graphic user interface) a user to register network information, service dependencies, and container image version matching policies with the topology dependency registry 122. The user may register service dependencies, container image information, and container image version matching policies for all deployments (i.e., microservices) applied within the cluster. For example, if deployments A, B, and C are applied to the cluster, the user may register any service dependencies (e.g., chain dependencies, circular dependencies) that may exist between the deployments A, B, and C, as well as container image version matching policy for each deployment in order to create a topology of the relationships between the deployments A, B, and C. The topology dependency registry 122 may also automatically collect runtime network information such as pod IP addresses of each deployment. Thus, the topology dependency registry 122 may maintain a record of the service dependencies (i.e., services topology) and container image version matching policies for the deployments A, B, and C within the cluster. Information maintained within the topology dependency registry 122 may be periodically accessed by the version controller 126.

Then, at 204, the version controlling program 120 detects, via the mutating webhook 124, an updated service deployment definition being applied to the cluster by the user. The API 118 may receive an update to a deployment definition within the cluster and subsequently begin a rolling update. However, the mutating webhook 124 may be notified by the API 118 of the updated deployment definition and intercept the commencement of the rolling update. Additionally, the mutating webhook 124 may notify the version controller 126 of the updated deployment definition. In continuance with the above example, the mutating webhook 124 may be notified by API 118 of an updated deployment definition for deployment C, intercept the commencement of the rolling update by the API 118, and notify the version controller 126 of the updated deployment definition for deployment C. The mutating webhook 124 may be implemented by leveraging existing mutating webhook capabilities of an open-source container orchestration system (e.g., the mutating webhook capability of Kubernetes®) to insert changes, by the version controller 126, to a deployment definition before it is persisted within the cluster.

Next, at 206, the version controlling program 120, via the version controller 126, determines whether the updated service deployment definition includes an update to the container image version for the deployment. Continuing with the running example above, the version controller 126 may determine whether the updated deployment definition for deployment C includes an update to the container image version for deployment C. In making this determination, the version controller 126 may access the topology dependency registry 122 to collect information relating to the current network information, service dependencies, container image information, and container image version matching policies (i.e., the current service topology) of deployment C in order to identify the dependency relationships of deployment C with other deployments (e.g., deployments A and B) of the cluster. The version controller 126 may also determine whether deployment C has ongoing connections with any pods of client microservices (e.g., deployments A and B). In response to determining the updated service deployment definition does not include an update to the container image version for deployment C (step 206, "No" branch), the pod lifecycle management during a rolling update process 200 may return to step 204 to continue to monitor for an updated deployment definition. In response to determining the updated service deployment definition does include an update to the container image version for deployment C and that the deployment C has ongoing connections to pods of client microservices (step 206, "Yes" branch), the pod lifecycle management during a rolling update process 200 may proceed to step 208.

Then, at 208, the version controlling program 120, via the version controller 126, takes over control of the lifecycle management for at least one previous version pod of the deployment being updated, and manages, via the service redirector 128, the forwarding of network requests (e.g., packets) for coexisting previous version and new version pods of the deployment being updated. In the example of step 206, since it was determined that deployment C has ongoing connections to client pods, the version controlling program 120 may not blindly delete all previous version of pods in deployment C, as normally occurs in the execution of a rolling update by API 118. Rather, the version controlling program 120 may keep at least one previous version pod of deployment C running (while other pods of deployment C are updated via the standard rolling update process) in order to allow deployment C to continue to communicate with and serve any previous version clients pods (e.g., a pod of deployment B that has yet to be updated to communicate the new payload expected by new version pods of updated deployment C). To this effect, the version controlling program 120 may, via the version controller 126, update an owner reference for at least one previous version pod of deployment C. By updating the owner reference of a previous version pod, the version controlling program 120 removes the previous version pod from deployment C and assumes control of the lifecycle management of the at least one previous version pod. There will still be a service C (i.e., deployment C) that the other microservices (e.g., deployment B) can call, however, underneath there may be a previous version group of pods and a new version (i.e., updated) group of pods. The new version pods are pods that have that finished the rolling update and have their lifecycle managed by deployment C. The previous version pods, whose lifecycle are now managed by the version controller 126, are unknown to deployment C and are able to serve requests using the previous version payload.

Additionally, at 208, the version controlling program 120, via the service redirector 128, creates shadow service rules (e.g., packet forwarding rules, IP tables, load balancing rules) to route incoming network requests for the deployment being updated among coexisting groups of pods, namely, a previous version group of pods and a new version group of pods. For example, the service redirector 128 may, based on input from the version controller 126, identify if an incoming service request from deployment B to deployment C is directed to the previous version group of pods or the new version group of pods, and, accordingly, forward the incoming service request to the correct group of pods, thus ensuring the matching of payload versions between deployments B and C. The version controlling program 120 may, via the service redirector 128 and a pod agent (e.g., agents 132, 142, 152) update the IP tables of those pods for which it has assumed lifecycle management. The created shadow service rules may handle the routing of requests for one or more previous version server pods until all client pods have been updated.

As an illustrative example, consider the following deployments in a Kubernetes® cluster:
  Deployment A: pod a1, pod a2, pod a3, image version A1, IPs: 10.240.5.6, 10.240.5,7, 10.240.5.8
  Deployment B: pod b1, pod b2, pod b3, image version B1, IPs: 10.240.6.6, 10.240.6.7, 10.240.6.8
  Deployment C: pod c1, pod c2, pod c3, image version C1, IPs: 10.240.7.6, 10.240.7.7, 10.240.7.8
  svc(AB): 172.16.10.100
  svc(BC): 172.16.20.100
  Where A is B's client, B is C's client; B is A's server, C is B's server In furtherance of the illustrative example, consider the updated pods of the deployments as follows:
  New C pods: image version2, IPs: 10.240.7.16, 10.240.7.17, 10.240.7.18
  New B pods: image version2, IPs: 10.240.6.16, 10.240.6.17, 10.240.6.18
  New A pods: image version2, IPs: 10.240.5.16, 10.240.5.17, 10.240.5.18

In this illustrative example, if deployment C is updated earlier than deployment B, the version controlling program 120 may, via the service redirector 128 create the following shadow service rules for packets from the previous version B pods to the previous version C pods:
  ipset create fwd4b nethash
  ipset add fdw4b 10.240.6.6
  ipset add fdw4b 10.240.6.7
  ipset add fdw4b 10.240.6.8
  -A KUBE-SEP-YQXEHXFWXRE6J2SS -p tcp -m tcp -j DNAT -m set- match-set fwd4b -to-destination 10.240.7.6:50051
  -A KUBE-SEP-YQXEHXFWXRE6J2HH -p tcp -m tcp -j DNAT -m set- match-set fwd4b -to-destination 10.240.7.7:50051
  -A KUBE-SEP-YQXEHXFWXRE6J2TT -p tcp -m tcp -j DNAT -m set- match-set fwd4b -to-destination 10.240.7.8:50051
New rules for new B pods to new C pods will be created by components of the Kubernetes® cluster itself in accordance with known processes. Previous version pods may utilize the shadow service rules created by the service redirector 128.

Next, at 210, the version controlling program 120 determines whether the rolling update has completed within the cluster. More specifically, the version controlling program 120 may, via the version controller 126 determine if dependent services (i.e., dependent deployments) with updated versions are available. In response to determining the update is not complete within the cluster (step 210, "No" branch), the pod lifecycle management during a rolling update process 200 may return to step 208 to continue to assume lifecycle management for previous version pods and maintain their shadow service rules. In response to determining the update is complete within the cluster (step 210, "Yes" branch), the pod lifecycle management during a rolling update process 200 may proceed to step 212.

Then, at 212, the version controlling program 120, via the version controller 126, deletes previous version pods as well as deletes shadow service rules utilized by the previous version pods. For example, the version controller 126 may delete previous version pods of deployment C and the shadow service rules utilized to forward packets from previous version B pods to the previous version C pods.

It may be appreciated that FIG. 2 provides only an illustration of one implementation and do not imply any limitations with regard to how different embodiments may be implemented. Many modifications to the depicted environments may be made based on design and implementation requirements.

Figure 3:
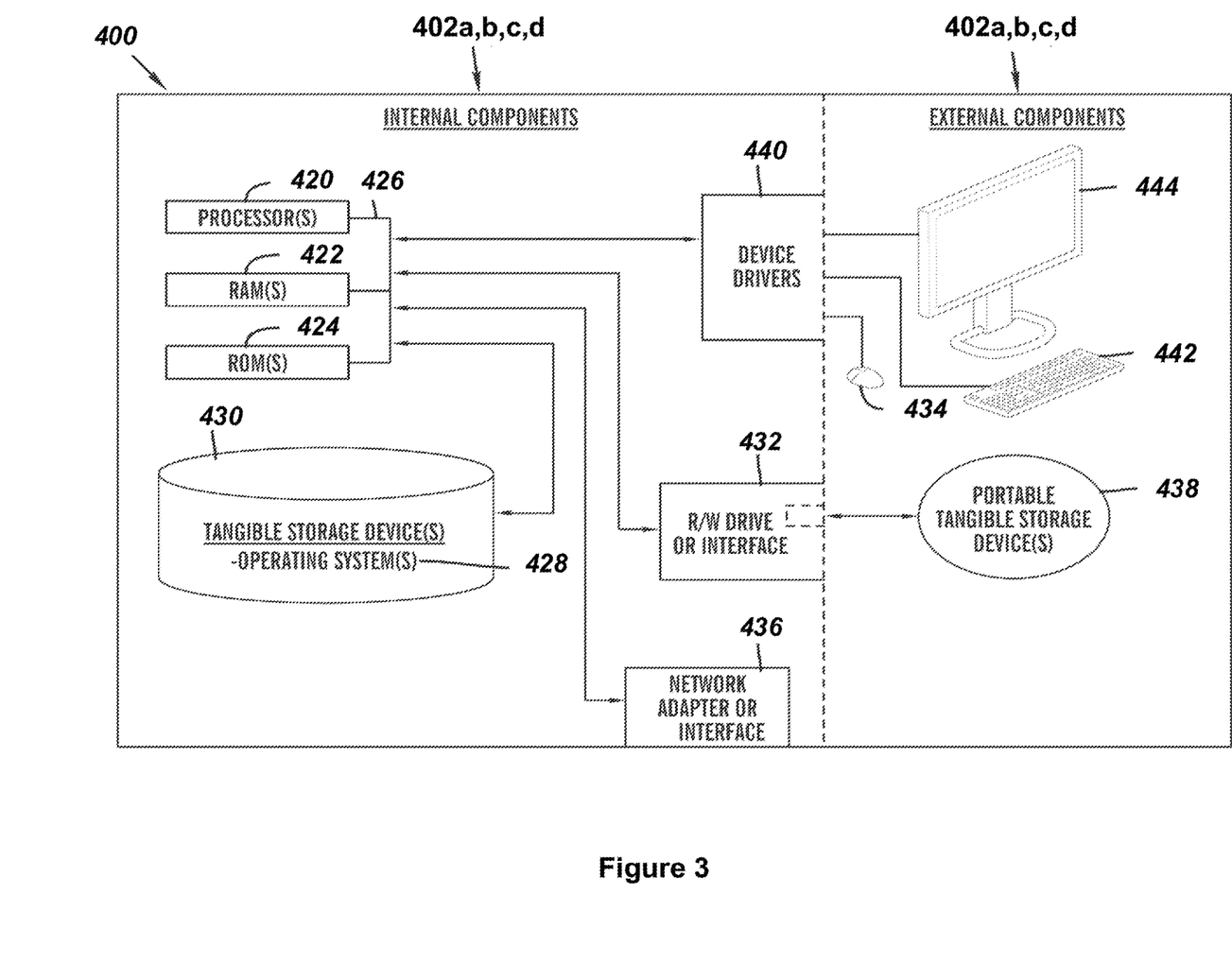
FIG. 3 is a block diagram of internal and external components of computers and servers depicted in FIG. 1 according to at least one embodiment.

FIG. 3 is a block diagram 400 of internal and external components of the control plane 110 and the nodes 130, 140, and 150 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The control plane 110 and the nodes 130, 140, and 150 may include respective sets of internal components 402a,b,c,d and external components 404a,b,c,d illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the scheduler 112, the controller 114, the ETCD 116, the API 118, and the version controlling program 120 in the control plane 110; the agent 132, the pod 134, and the container 136 in the node 130; the agent 142, the pod 144, and the container 146 in the node 140; and the agent 152, the pod 154, and the container 156 in the node 150 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b,c,d also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the version controlling program 120 can be stored on one or more of the respective portable computer-readable tangible storage devices 438, read via the respective R/W drive or interface 432, and loaded into the respective hard drive 430.

Each set of internal components 402a,b,c,d also includes network adapters or interfaces 436 such as a TCP/IP adapter cards, wireless Wi-Fi interface cards, or 3G or 4G wireless interface cards or other wired or wireless communication links. The scheduler 112, the controller 114, the ETCD 116, the API 118, and the version controlling program 120 in the control plane 110; the agent 132, the pod 134, and the container 136 in the node 130; the agent 142, the pod 144, and the container 146 in the node 140; and the agent 152, the pod 154, and the container 156 in the node 150 can be downloaded to the control plane 110 and the nodes 130, 140, 150 from an external computer via a network (for example, the Internet, a local area network or other, wide area network) and respective network adapters or interfaces 436. From the network adapters or interfaces 436, the scheduler 112, the controller 114, the ETCD 116, the API 118, and the version controlling program 120 in the control plane 110; the agent 132, the pod 134, and the container 136 in the node 130; the agent 142, the pod 144, and the container 146 in the node 140; and the agent 152, the pod 154, and the container 156 in the node 150 are loaded into the respective hard drive 430. The network may comprise copper wires, optical fibers, wireless transmission, routers, firewalls, switches, gateway computers and/or edge servers.

Each of the sets of external components 404a,b,c,d can include a computer display monitor 444, a keyboard 442, and a computer mouse 434. External components 404a,b,c,d can also include touch screens, virtual keyboards, touch pads, pointing devices, and other human interface devices. Each of the sets of internal components 402a,b,c,d also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
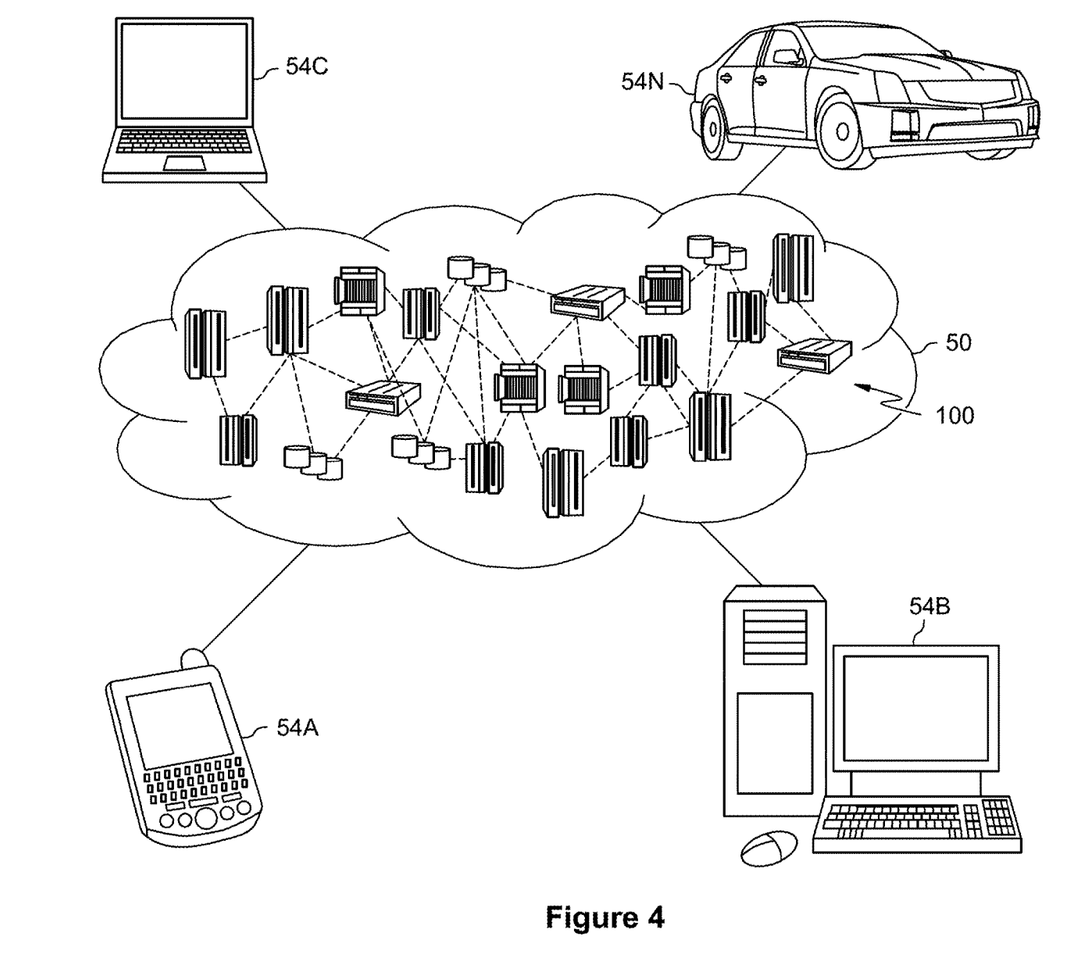
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 5:
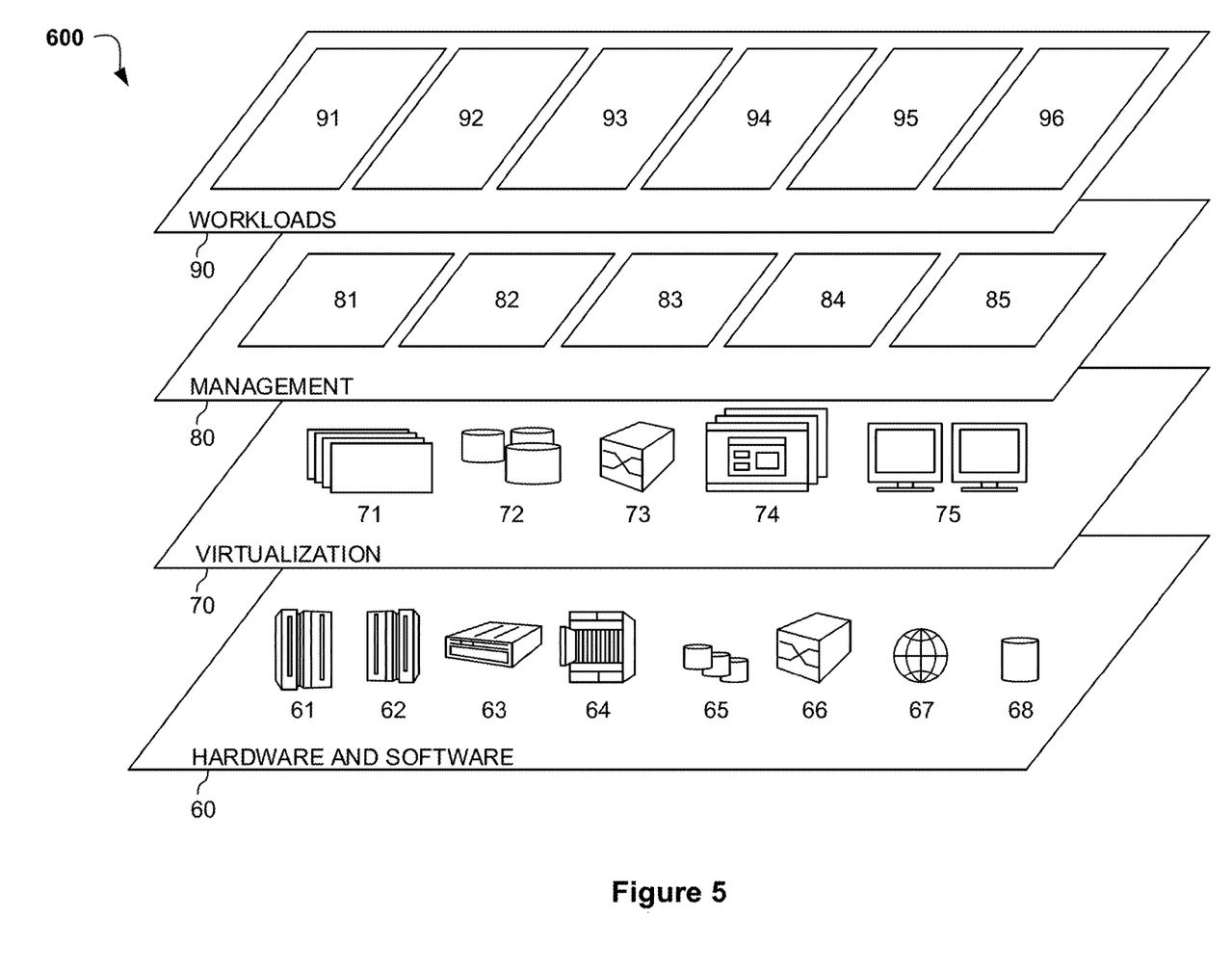
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container lifecycle management 96. Container lifecycle management 96 may relate to the management of containers and their respective pods in an open-source container orchestration system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for container lifecycle management, the method comprising:
    registering a topology for a plurality of deployments in a container orchestration platform;
    detecting a rolling update of a deployment of the plurality of deployments, to a new version;
    in response to determining that the deployment has one or more ongoing connections to one or more pods of one or more other deployments within the plurality of deployments, assuming ownership, via a version controller, of at least one previous version pod of the deployment, wherein the assuming removes the at least one previous version pod from the deployment;
    creating network routing rules for the at least one previous version pod; and
    while other pods of the deployment are updating to respective new versions via the rolling update, routing network packets to the at least one previous version pod based on the created network routing rules, wherein the at least one previous version pod coexists with the respective new versions of the other pods of the deployment.

2. The method of claim 1:
    determining the rolling update is complete within the plurality of deployments;

deleting the at least one previous version pod; and
deleting the created network routing rules.

3. The method of claim 1, wherein the topology comprises service dependencies between the plurality of deployments.

4. The method of claim 1, wherein the rolling update comprises a container image version update.

5. The method of claim 1, wherein the at least one previous version pod is a server pod, and wherein the network packets are from client pods of the one or more other deployments within the plurality of deployments.

6. The method of claim 1, wherein assuming ownership of the at least one previous version pod comprises updating an owner reference of the at least one previous version pod.

7. The method of claim 1, wherein the container orchestration platform comprises a Kubernetes cluster.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
registering a topology for a plurality of deployments in a container orchestration platform;
detecting a rolling update of a deployment of the plurality of deployments to a new version;
in response to determining that the deployment has one or more ongoing connections to one or more pods of one or more other deployments within the plurality of deployments, assuming ownership, via a version controller, of at least one previous version pod of the deployment, wherein the assuming removes the at least one previous version pod from the deployment;
creating network routing rules for the at least one previous version pod; and
while other pods of the deployment are updating to respective new versions via the rolling update, routing network packets to the at least one previous version pod based on the created network routing rules, wherein the at least one previous version pod coexists with the respective new versions of the other pods of the deployment.

9. The computer system of claim 8, further comprising:
determining the rolling update is complete within the plurality of deployments;
deleting the at least one previous version pod; and
deleting the created network routing rules.

10. The computer system of claim 8, wherein the topology comprises service dependencies between the plurality of deployments.

11. The computer system of claim 8, wherein the rolling update comprises a container image version update.

12. The computer system of claim 8, wherein the at least one previous version pod is a server pod, and wherein the network packets are from client pods of the one or more other deployments within the plurality of deployments.

13. The computer system of claim 8, wherein assuming ownership of the at least one previous version pod comprises updating an owner reference of the at least one previous version pod.

14. The computer system of claim 8, wherein the container orchestration platform comprises a Kubernetes cluster.

15. A computer program product, the computer program product comprising:
one or more computer-readable tangible storage medium and program instructions stored on at least one of the one or more tangible storage medium, the program instructions executable by a processor capable of performing a method, the method comprising:
registering a topology for a plurality of deployments in a container orchestration platform;
detecting a rolling update of a deployment of the plurality of deployments to a new version;
in response to determining that the deployment has one or more ongoing connections to one or more pods of one or more other deployments within the plurality of deployments, assuming ownership, via a version controller, of at least one previous version pod of the deployment, wherein the assuming removes the at least one previous version pod from the deployment;
creating network routing rules for the at least one previous version pod; and
while other pods of the deployment are updating to respective new versions via the rolling update, routing network packets to the at least one previous version pod based on the created network routing rules, wherein the at least one previous version pod coexists with the respective new versions of the other pods of the deployment.

16. The computer program product of claim 15, further comprising:
determining the rolling update is complete within the plurality of deployments;
deleting the at least one previous version pod; and
deleting the created network routing rules.

17. The computer program product of claim 15, wherein the topology comprises service dependencies between the plurality of deployments.

18. The computer program product of claim 15, wherein the rolling update comprises a container image version update.

19. The computer program product of claim 15, wherein the at least one previous version pod is a server pod, and wherein the network packets are from client pods of the one or more other deployments within the plurality of deployments.

20. The computer program product of claim 15, wherein assuming ownership of the at least one previous version pod comprises updating an owner reference of the at least one previous version pod.

\* \* \* \* \*